US008468270B2

(12) United States Patent
Lobuono

(10) Patent No.: US 8,468,270 B2
(45) Date of Patent: Jun. 18, 2013

(54) METHOD, SYSTEM, AND APPARATUS FOR ARCHIVING NETWORKED DATA

(75) Inventor: Mark Anthony Lobuono, Southfield, MI (US)

(73) Assignee: General Electric Company, Schenectady, NY (US)

( * ) Notice: Subject to any disclaimer, the term of this patent is extended or adjusted under 35 U.S.C. 154(b) by 770 days.

(21) Appl. No.: 12/636,130

(22) Filed: Dec. 11, 2009

(65) Prior Publication Data

US 2011/0145203 A1  Jun. 16, 2011

(51) Int. Cl.
*G06F 15/16* (2006.01)

(52) U.S. Cl.
USPC ........................................................ 709/248

(58) Field of Classification Search
USPC ........................................................ 709/248
See application file for complete search history.

(56) References Cited

U.S. PATENT DOCUMENTS

| 6,295,573 | B1 * | 9/2001 | Bailey et al. | 710/260 |
| 8,005,496 | B2 * | 8/2011 | Hardy et al. | 455/507 |
| 2002/0137458 | A1 * | 9/2002 | Talwalkar et al. | 455/15 |
| 2005/0243771 | A1 * | 11/2005 | Hardy et al. | 370/331 |
| 2008/0167062 | A1 * | 7/2008 | Gilbert et al. | 455/516 |

FOREIGN PATENT DOCUMENTS

EP  1736839 A2  12/2006

OTHER PUBLICATIONS

Theiss, S. et al., "PLC-Integrated Process Monitoring and Prediction of the Resulting Real-Time Load", 2006 IEEE International Conference on Industrial Informatics, Aug. 1, 2006, pp. 880-885, XP031003469.
The PCT International Search Report and Written Opinion issued in connection with corresponding PCT Application No. PCT/US2010/057462 on Mar. 8, 2011.

* cited by examiner

*Primary Examiner* — Kristie Shingles
(74) *Attorney, Agent, or Firm* — Global Patent Operation; Mark A. Conklin

(57) ABSTRACT

A method for archiving networked data includes repeatedly transmitting an interrupt message to at least one controller, wherein each transmission of the interrupt message includes a data collection command, and wherein a portion of the transmissions of the interrupt message includes the data collection command and a time synchronization command. The method also includes receiving event data from the at least one controller in response to the data collection command, and storing the event data in a memory.

13 Claims, 2 Drawing Sheets

METHOD, SYSTEM, AND APPARATUS FOR ARCHIVING NETWORKED DATA

BACKGROUND

The embodiments described herein relate generally to a data archiving system and, more particularly, to a system for collecting and archiving event data with a high degree of time precision.

At least some known systems collect data via a network for storage in a database according to a timestamp or an equivalent identifier. Moreover, at least some known systems resolve the timestamp to a minimum precision, such as approximately 10 milliseconds, according to a speed of a processor used to collect and store the data. Such systems depend on increasing processor speeds to reduce the precision. However, such systems do not enable synchronization between clock circuits to an absolute, worldwide time standard.

BRIEF DESCRIPTION

In one aspect, a method is provided for archiving networked data. The method includes repeatedly transmitting an interrupt message to at least one controller, wherein each transmission of the interrupt message including a data collection command, and wherein a portion of the transmissions of the interrupt message including the data collection command and a time synchronization command. The method also includes receiving event data from the at least one controller in response to the data collection command, and storing the event data in a memory.

In another aspect, a data archiving system is provided, including at least one controller and a server coupled to the controller via a network. The controller includes a clock circuit, and is configured to receive event data from at least one input/output (I/O) module. The server includes a memory, and is configured to periodically transmit an interrupt message to the controller, wherein each transmission of the interrupt message including a data collection command, and wherein a portion of the transmissions of the interrupt message including the data collection command and a time synchronization command. The server is further configured to receive event data from the controller in response to the data collection command, and storing the event data in the memory.

In another aspect, a server is provided, wherein the server is coupled to at least one controller via a network. The server includes a master clock circuit configured to receive a master time value, and a memory configured to store event data. The server also includes a processor coupled to the master clock circuit and to the memory. The processor is configured to periodically transmit an interrupt message to the controller, wherein each transmission of the interrupt message including a data collection command, and wherein a portion of the transmissions of the interrupt message including the data collection command and a time synchronization command. The processor is further configured to receive event data from the controller in response to the data collection command, and store the event data in the memory.

BRIEF DESCRIPTION OF THE DRAWINGS

The embodiments described herein may be better understood by referring to the following description in conjunction with the accompanying drawings.

DETAILED DESCRIPTION

Exemplary embodiments of methods, systems, and apparatus for use in archiving networked data are described herein. The embodiments described herein facilitate rapidly archiving event data that is accurate to approximately 1.0 millisecond of absolute time as determined by Global Positioning System (GPS) standards. Archiving event data at such a rapid rate and within a defined precision enables data analysis with respect to absolute time. Moreover, archiving event data at such a rapid rate and within a defined precision facilitates generating a real time input/output (I/O) image of event data as it changes in a real world system. Such an I/O image enables more robust analysis and audit procedures.

Exemplary technical effects of the methods, systems, and apparatus described herein include at least one of: (a) collecting digital and/or analog event data using a data collection command embedded in an interrupt message transmitted to each controller by a server at a first frequency; (b) synchronizing a clock circuit within each controller according to a GPS master time value distributed to each controller via a time synchronization command embedded, along with the data collection command, in the interrupt message transmitted to each controller by a server at a second frequency that is less than the first frequency; and (c) storing the event data in a memory, such as a database, according to the timestamp.

Figure 1:
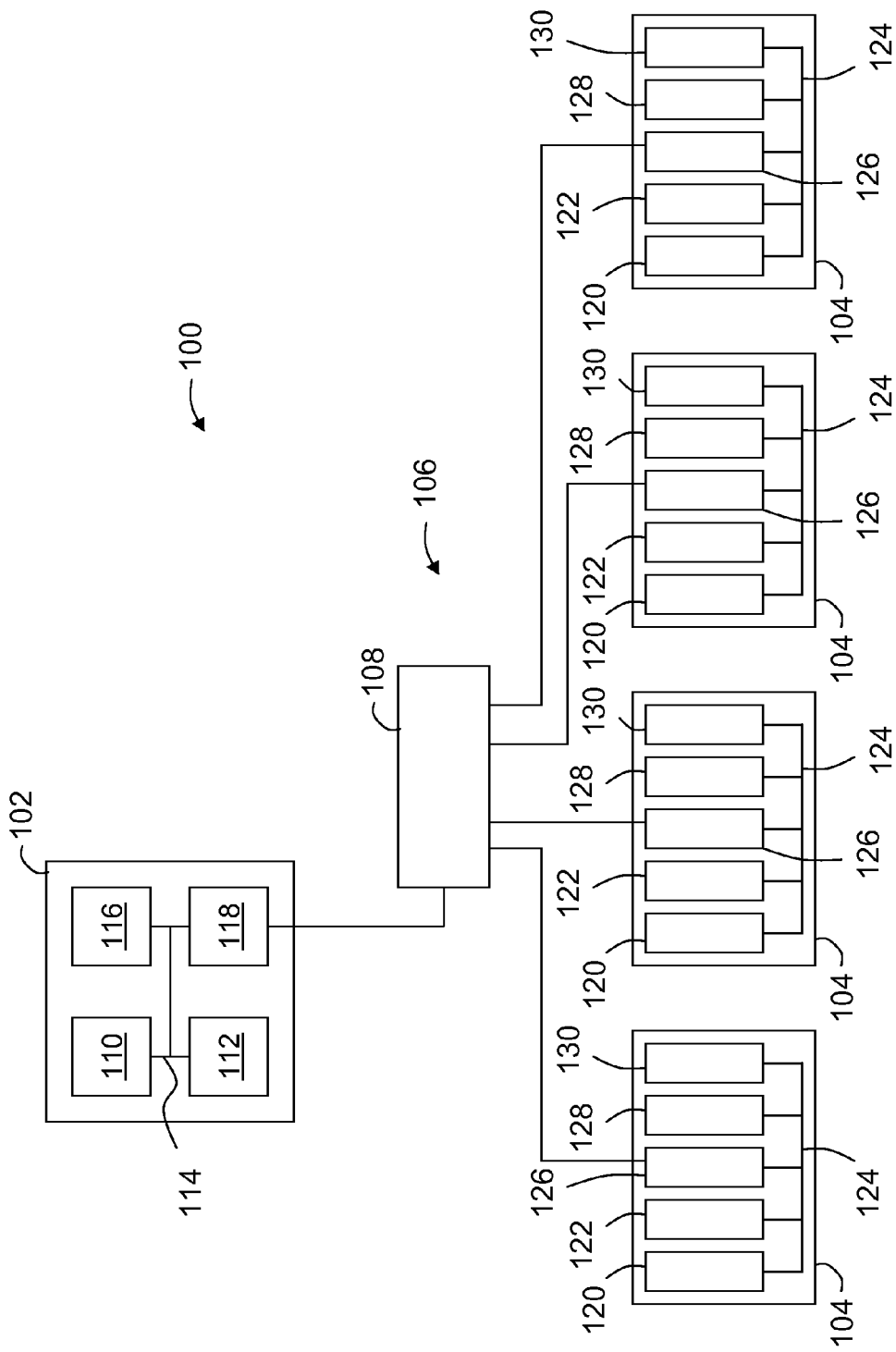
FIG. 1 is a schematic block diagram of an exemplary data archiving system.

FIG. 1 is a schematic block diagram of an exemplary data archiving system 100 for use in collecting and storing digital event data and/or analog event data. In the exemplary embodiment, system 100 includes a server 102 and a plurality of controllers 104 connected to server 102 via a network 106. Moreover, in the exemplary, network 106 is a reflective memory network. However, network 106 may be any suitable network for use in high-speed transfer of event data. In the exemplary embodiment, network 106 includes a hub 108, such as a reflective memory hub, that communicatively couples server 102 and controllers 104. Controllers 104 may be programmable logic controllers (PLCs) or programmable automation controllers (PACs).

Moreover, in the exemplary embodiment, server 102 includes a processor 110 and a memory 112 coupled to processor 110 via a system bus 114. In some embodiments, server 102 includes multiple processors 110. In the exemplary embodiment, memory 112 is a database that is capable of archiving event data at a high rate, such as approximately 256,000 time stamped events per second. It should be understood that memory 112 may include alternative types of memory such as, but not limited to, random access memory (RAM), read only memory (ROM), reflective memory, or any suitable memory for use in archiving event data. Furthermore, in the exemplary embodiment, server 102 includes a master clock circuit 116 that is coupled to processor 110 and to memory 112 via system bus 114. An exemplary master clock circuit is a Global Positioning System (GPS) satellite receiver computer card that receives a master time value from one or more GPS satellites (not shown). However, any suitable master clock circuit may be used that enables server 102 to receive a master time value and to transmit the master time value to controllers 104. In the exemplary embodiment, server 102 also includes a network interface 118 that couples server 102 to network 106. Network interface 118 is also coupled to processor 110, to memory 112, and/or to master clock circuit 116 via system bus 114. Moreover, in the exemplary embodiment, network interface 118 is a reflective memory computer card that enables communication with hub 108 and controllers 104 via a reflective memory network, such as network 106.

In the exemplary embodiment, each controller 104 includes a processor 120 and a clock circuit 122 coupled to processor 120 via a system bus 124. In some embodiments, controller 104 includes multiple processors 120. Clock circuit 122 synchronizes tasks in controller 104 by emitting a continuous stream of precise high and low pulses that have approximately the same length. One clock cycle is the time that passes from the start of one high pulse, until the start of the next. If several events are supposed to happen in one clock cycle, the cycle is subdivided by inserting a circuit with a known delay in it, thus providing more highs and more lows. Moreover, in some embodiments, processor 120 is operable to synchronize tasks, rather than clock circuit 122. In the exemplary embodiment, controller 104 also includes a network interface 126 that couples controller 104 to network 106. Network interface 126 is also coupled to processor 120 and/or clock circuit 122 via system bus 124. Moreover, in the exemplary embodiment, network interface 126 is a reflective memory computer card that enables communication with hub 108 and server 102 via a reflective memory network, such as network 106.

Each controller 104 also includes one or more digital input/output (I/O) modules 128 and one or more analog I/O modules 130. Digital I/O module 128 and analog I/O module 130 are each coupled to processor 120, clock circuit 122, and/or network interface 126 via system bus 124. Digital I/O module 128 receives digital event data via a plurality of inputs (not shown). For example, digital I/O module 128 may receive digital event data via up to 256 digital inputs. Analog I/O module 130 receives analog event data via a plurality of inputs (not shown). For example, analog I/O module 130 may receive analog event data via up to 16 analog inputs. In some embodiments, digital I/O module 128 receives digital data via more than 256 digital inputs. Moreover, in some embodiments, analog I/O module 130 receives analog data via more than 16 analog inputs. In the exemplary embodiment, controller 104 generates a timestamp when receiving event data. For example, when controller 104 receives event data that relates to an event with a time of occurrence, controller 104 generates a timestamp and associates the timestamp with the event data. In the exemplary embodiment, an amount of precision of the timestamp is approximately 1.0 millisecond (msec). The precision is the difference between the timestamp and the time of occurrence of the event.

Figure 2:
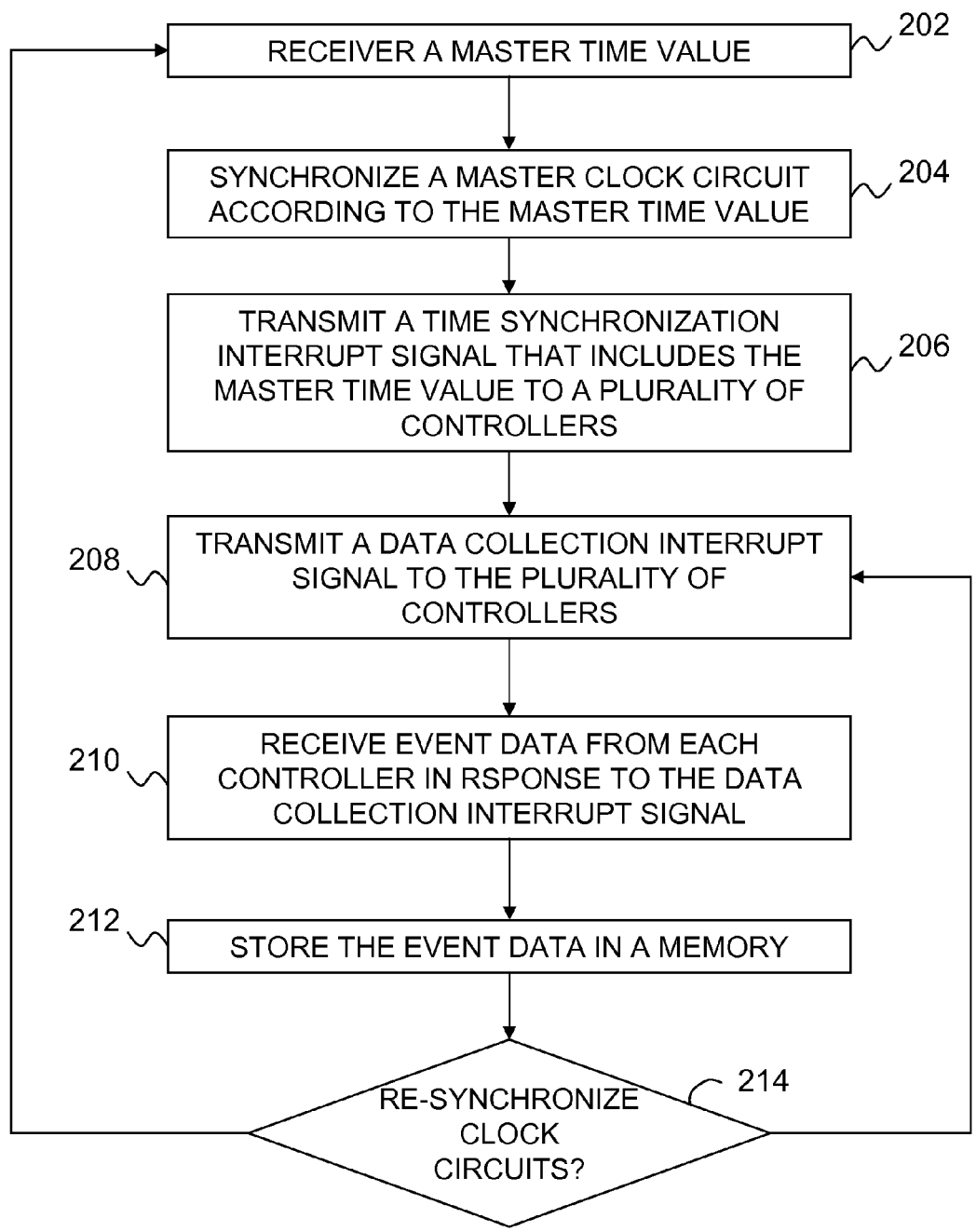
FIG. 2 is a flowchart that illustrates an exemplary method for archiving networked data using the data archiving system shown in FIG. 1.

FIG. 2 is a flowchart 200 that illustrates an exemplary method for archiving networked data using data archiving system 100 (shown in FIG. 1). In the exemplary embodiment, and referring to FIG. 1, server 102 receives a master time value from one or more satellites. More specifically, master clock circuit 116 receives the master time value from one or more GPS satellites. The GPS satellites transmit, such as periodically transmit, the master time value to master clock circuit 116 for use in synchronizing a system time to within a predefined precision, such as approximately 10.0 microseconds (μsec).

Moreover, in the exemplary embodiment, server 102 embeds 202 a data collection command in an interrupt message. Specifically, processor 110 embeds the data collection command in a reflective memory network interrupt message. Server 102 then transmits 204 the interrupt message to controllers 104 via network 106. Specifically, server 102 transmits the interrupt message via network interface 118 and network 106. Each controller 104 receives the interrupt message via network interface 126. In the exemplary embodiment, server 102 transmits 204 the interrupt message, including the data collection command, at a first frequency, such as approximately every 1.0 millisecond (msec).

In response to the data collection command, each controller 104 returns event data, including digital event data and/or analog event data, to server 102 via network 106. In the exemplary embodiment, the event data includes a timestamp that corresponds to a time that controller 104 receives the event data from digital I/O module 128 and/or analog I/O module 130. Accordingly, server 102 receives 206 event data from each controller 104. Specifically, server 102 receives event data from each controller 104 at the first frequency, such as approximately every 1.0 msec. Server 102 stores 208 the event data in memory 112. Specifically, processor 110 stores the event data in memory 112 in association with the timestamp.

In the exemplary embodiment, server 102 determines 210 whether to synchronize clock circuit 122 in each controller 104 using a time synchronization command. Specifically, server 102 embeds 212 a time synchronization command, along with the data collection command, into the interrupt message at a second frequency that is less than the first frequency, such as approximately every 1.0 second. Accordingly, if a full period of the second frequency has not elapsed, server 102 does not embed the time synchronization command into the interrupt message. Rather, server 102 continues to transmit 204 the interrupt message including only the data collection command. If a full period of the second frequency has elapsed, processor 110 embeds 212 the master time value received from master clock circuit 116 into the interrupt message. After embedding the time synchronization command into the interrupt message, server 102 transmits 204 the interrupt message as described above. In response to the data collection command, each controller 104 returns event data as described above. Moreover, in response to the time synchronization command, each controller 104 synchronizes clock circuit 122 using the master time value.

Exemplary embodiments of methods, systems, and apparatus for use in rapidly archiving event data according to an absolute, worldwide time standard are described above in detail. The methods, systems, and apparatus are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

A server or controller, such as those described herein, includes at least one processor or processing unit and a system memory. The server or controller typically has at least some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Embodiments of the invention may be described in the general context of computer-executable instructions, such as program components or modules, executed by one or more computers or other devices. Aspects of the invention may be implemented with any number and organization of components or modules. For example, aspects of the invention are not limited to the specific computer-executable instructions or the specific components or modules illustrated in the figures and described herein. Alternative embodiments of the invention may include different computer-executable instructions or components having more or less functionality than illustrated and described herein.

Although the present invention is described in connection with an exemplary industrial control system environment, embodiments of the invention are operational with numerous other general purpose or special purpose industrial control system environments or configurations. The industrial control system environment is not intended to suggest any limitation as to the scope of use or functionality of any aspect of the invention. Moreover, the industrial control system environment should not be interpreted as having any dependency or requirement relating to any one or combination of components illustrated in the exemplary operating environment. Examples of well known industrial control systems, environments, and/or configurations that may be suitable for use with aspects of the invention include, but are not limited to, personal computers, server computers, handheld or laptop devices, multiprocessor systems, microprocessor-based systems, minicomputers, mainframe computers, distributed computing environments that include any of the above systems or devices, and the like.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, the term "processor" refers generally to any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, the term "database" refers generally to any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. An exemplary database is Proficy® Historian (Proficy® is a registered trademark of GE Fanuc Automation Americas, Inc., Charlottesville, Va.). Additional examples of databases include, but are not limited to only including, Oracle® Database, IBM® DB2, and Sybase®. However, any database may be used that enables the systems and methods described herein. (Oracle is a registered trademark of Oracle Corporation, Redwood Shores, Calif.; IBM is a registered trademark of International Business Machines Corporation, Armonk, N.Y.; and Sybase is a registered trademark of Sybase, Dublin, Calif.)

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for archiving networked data, said method comprising:
    embedding a data collection command in an interrupt message;
    repeatedly transmitting the interrupt message to at least one controller;
    periodically transmitting the interrupt message;
    receiving event data from the at least one controller in response to the data collection command;
    transmitting the interrupt message with the data collection command at a first frequency;
    embedding a time synchronization command into the interrupt message;
    transmitting the interrupt message with the data collection command and the time synchronization command at a second frequency that is less than the first frequency; and
    storing the event data in a memory.

2. The method in accordance with claim 1, further comprising receiving a master time value from a master clock circuit.

3. The method in accordance with claim 1, wherein embedding the time synchronization command in the interrupt message comprises embedding the master time value in the time synchronization command.

4. A data archiving system comprising:
    at least one controller comprising a clock circuit, said at least one controller configured to receive event data from at least one input/output (I/O) module; and
    a server coupled to said at least controller via a network, said server comprising a memory, said server configured to:
        embed a data collection command in an interrupt message;
        periodically transmit an interrupt message to said at least one controller;
        receive event data from said at least one controller in response to the data collection command;
        transmit the interrupt message with the data collection command at a first frequency;
        embed a time synchronization command into the interrupt message;

transmit the interrupt message with the data collection command and the time synchronization command at a second frequency that is less than the first frequency; and store the event data in said memory.

5. The data archiving system in accordance with claim 4, wherein said server further comprises a Global Positioning System (GPS) receiver configured to receive a master time value from a plurality of GPS satellites.

6. The data archiving system in accordance with claim 4, wherein said at least one controller is further configured to synchronize said clock circuit based on the time synchronization command.

7. The data archiving system in accordance with claim 4, wherein said memory comprises a database.

8. The data archiving system in accordance with claim 7, wherein said server is configured to store the event data in said database in association with a timestamp.

9. A server coupled to at least one controller via a network, said server comprising:
- a master clock circuit configured to receive a master time value;
- a memory configured to store event data; and
- a processor coupled to said master clock circuit and said memory, said processor configured to:
  - embed a data collection command in an interrupt message;
  - periodically transmit the interrupt message to the at least one controller;
  - receive event data from the at least one controller in response to the data collection command;
  - transmit the interrupt message with the data collection command at a first frequency;
  - embed a time synchronization command into the interrupt message;
  - transmit the interrupt message with the data collection command and the time synchronization command at a second frequency that is less than the first frequency; and
  - store the event data in said memory.

10. The server in accordance with claim 9, wherein said master clock circuit comprises a Global Positioning System (GPS) time receiver configured to receive the master time value from a plurality of GPS satellites.

11. The server in accordance with claim 9, wherein said processor is further configured to embed the master time value in the time synchronization command.

12. The server in accordance with claim 9, wherein said memory comprises a database.

13. The server in accordance with claim 12, wherein said server is configured to store the event data in said database in association with a timestamp.

* * * * *